US012715288B2

(12) United States Patent
Huang et al.

(10) Patent No.: US 12,715,288 B2
(45) Date of Patent: Aug. 25, 2026

(54) AUXILIARY OPERATION SYSTEM AND AUXILIARY OPERATION METHOD OF VEHICLE DEVICE

(71) Applicants: Innolux Corporation, Miaoli County (TW); CARUX TECHNOLOGY PTE. LTD., Singapore (SG)

(72) Inventors: Yu-Chia Huang, Miaoli County (TW); Yu-Jhou Gong, Miaoli County (TW); Tsung-Han Tsai, Miaoli County (TW); Kuan-Feng Lee, Miaoli County (TW); Li-Wei Sung, Tainan (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/969,323

(22) Filed: Dec. 5, 2024

(65) Prior Publication Data

US 2025/0214424 A1 Jul. 3, 2025

(30) Foreign Application Priority Data

Jan. 3, 2024 (CN) ........................ 202410007667.8

(51) Int. Cl.
*B60K 35/10* (2024.01)
*B60K 35/22* (2024.01)
(Continued)

(52) U.S. Cl.
CPC .............. *B60K 35/10* (2024.01); *B60K 35/22* (2024.01); *B60K 35/25* (2024.01); *B60K 35/26* (2024.01);
(Continued)

(58) Field of Classification Search
CPC ........ B60K 35/10; B60K 35/25; B60K 35/22; B60K 35/26; B60K 2360/1438;
(Continued)

(56) References Cited

U.S. PATENT DOCUMENTS

2010/0057305 A1 3/2010 Breed
2015/0210292 A1 * 7/2015 George-Svahn ....... G06V 40/19 348/148
(Continued)

FOREIGN PATENT DOCUMENTS

CN 106502570 3/2017

*Primary Examiner* — Yaron Cohen
(74) *Attorney, Agent, or Firm* — JCIPRNET

(57) ABSTRACT

An auxiliary operation system and an auxiliary operation method of a vehicle device are provided. The auxiliary operation system includes a display, multiple sensing units, a response unit, a compensation unit, and a control unit. The display has a human-computer interaction interface. The sensing units are disposed at different positions in a vehicle and are configured to sense object spatial information. The response unit is configured to determine whether a touch condition is met according to a sensing signal of at least one of the sensing units to generate a response position signal. The compensation unit is configured to receive multiple sensing signals from the sensing units to generate a compensation signal. The control unit is configured to generate an operation signal according to the response position signal and the compensation signal. The operation signal is configured to adjust a trigger position of the human-computer interaction interface.

20 Claims, 12 Drawing Sheets

(51) Int. Cl.
*B60K 35/25* (2024.01)
*B60K 35/26* (2024.01)
*G06F 3/01* (2006.01)
*G06F 3/041* (2006.01)
*G06T 7/70* (2017.01)

(52) U.S. Cl.
CPC ............ *G06F 3/013* (2013.01); *G06F 3/0412* (2013.01); *G06T 7/70* (2017.01); *B60K 2360/1438* (2024.01); *B60K 2360/146* (2024.01); *G06T 2207/10048* (2013.01); *G06T 2207/30268* (2013.01)

(58) Field of Classification Search
CPC .. B60K 2360/146; B60K 35/60; B60K 35/80; G06T 7/70; G06T 2207/10048; G06T 2207/30268; G06F 3/013; G06F 3/0412; G06F 3/016
See application file for complete search history.

(56) References Cited

U.S. PATENT DOCUMENTS

| | | | | |
|---|---|---|---|---|
| 2018/0267603 | A1* | 9/2018 | Bastian ................. | B60W 50/14 |
| 2022/0391020 | A1 | 12/2022 | Tarayan | |
| 2023/0004230 | A1 | 1/2023 | Pegorier et al. | |
| 2023/0086516 | A1* | 3/2023 | Meyer ................... | B60K 35/50 345/173 |

* cited by examiner

AUXILIARY OPERATION SYSTEM AND AUXILIARY OPERATION METHOD OF VEHICLE DEVICE

CROSS-REFERENCE TO RELATED APPLICATION

This application claims the priority benefit of China application serial no. 202410007667.8, filed on Jan. 3, 2024. The entirety of the above-mentioned patent application is hereby incorporated by reference herein and made a part of this specification.

BACKGROUND

Technical Field

The disclosure relates to an operation system, and in particular to an auxiliary operation system and an auxiliary operation method of a vehicle device.

Description of Related Art

For the operation of a traditional in-vehicle device, the control of the relevant in-vehicle device can only be implemented by a user manually operating a physical button, a knob, or a key, or by the user directly touching a display touch panel with a finger. In other words, under different usage requirements (such as different user features, user postures, and/or user identities), the traditional manner of sensing a touch result through the display touch panel cannot always provide appropriate touch modes and touch determination conditions.

SUMMARY

An auxiliary operation system and an auxiliary operation method of the disclosure can allow a user to operate a vehicle device effectively and conveniently.

According to an embodiment of the disclosure, an auxiliary operation system of a vehicle device includes a display, multiple sensing units, a response unit, a compensation unit, and a control unit. The display has a human-computer interaction interface. The sensing units are disposed at different positions in a vehicle and are configured to sense object spatial information. The response unit is coupled to the sensing units and is configured to determine whether a touch condition is met according to a sensing signal of at least one of the sensing units to generate a response position signal. The compensation unit is coupled to the sensing units and is configured to receive multiple sensing signals of the sensing units to generate a compensation signal. The control unit is coupled to the response unit and the compensation unit, and is configured to generate an operation signal according to the response position signal and the compensation signal. The operation signal is configured to adjust a trigger position of the human-computer interaction interface.

According to an embodiment of the disclosure, an auxiliary operation method of a vehicle device of the disclosure includes the following steps. Object spatial information is sensed through multiple sensing units. Whether a touch condition is met is determined through a response unit according to a sensing signal of at least one of the sensing units to generate a response position signal. Multiple sensing signals of the sensing units are received through a compensation unit to generate a compensation signal. An operation signal is generated through a control unit according to the response position signal and the compensation signal. The operation signal is configured to adjust a trigger position of a human-computer interaction interface.

Based on the above, the auxiliary operation system and the auxiliary operation method of the disclosure can sense an in-vehicle environment and user information through the sensing units to determine a touch operation by the user and generate the corresponding response position signal and compensation signal to implement the touch operation by the user.

In order for the features and advantages of the disclosure to be more comprehensible, the following specific embodiments are described in detail in conjunction with the drawings.

DESCRIPTION OF THE EMBODIMENTS

Figure 1:
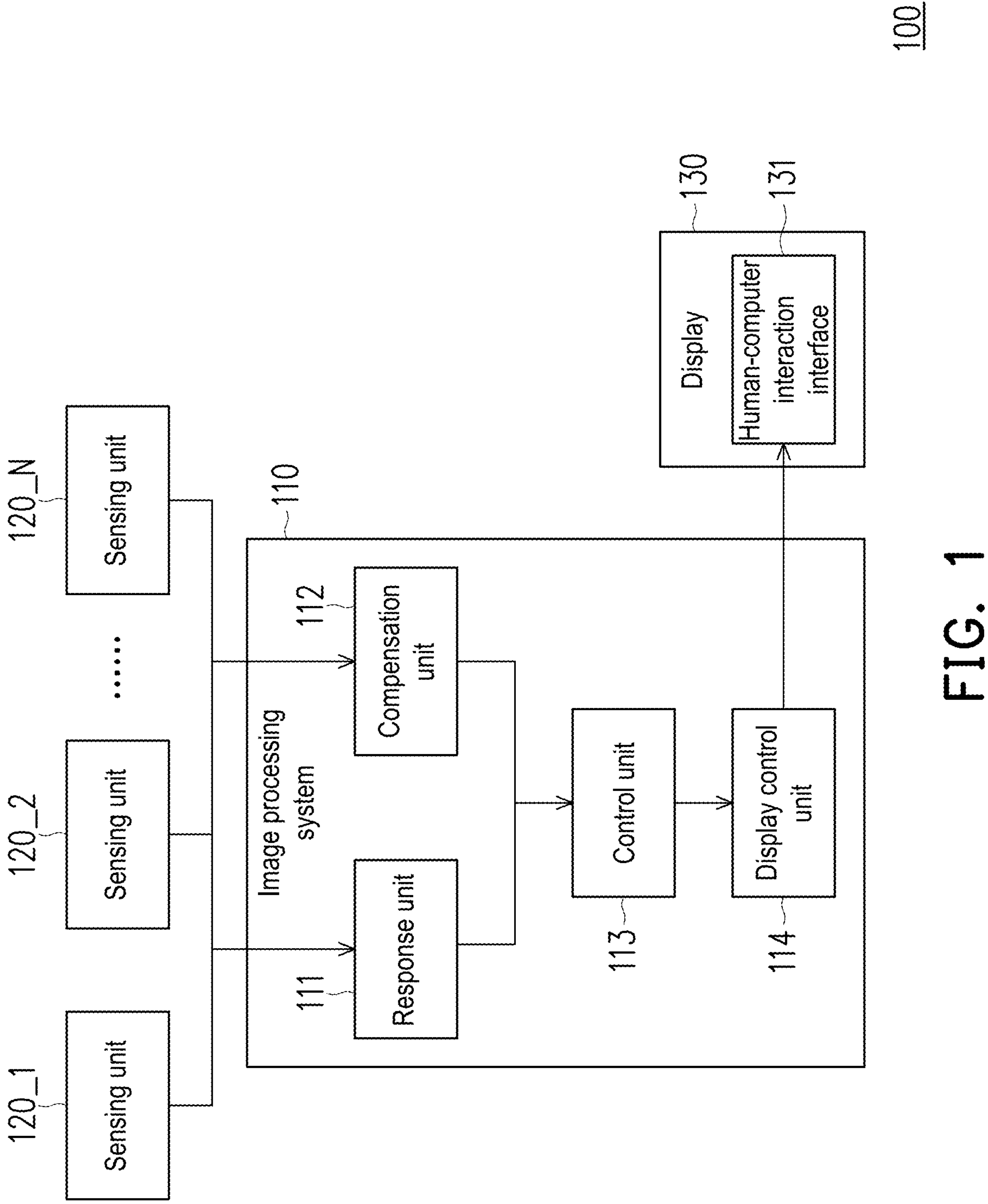
FIG. 1 is a schematic diagram of an auxiliary operation system according to an embodiment of the disclosure.

The drawings are included to provide a further understanding of the disclosure, and the drawings are incorporated in and constitute a part of the specification. The drawings illustrate exemplary embodiments of the disclosure and serve to explain principles of the disclosure together with the description.

Throughout the specification and the appended claims of the disclosure, certain terms are used to refer to specific components. Persons skilled in the art will appreciate that manufacturers of electronic devices may refer to the same components using different names.

The disclosure is not intended to differentiate between components that have the same functionality but different names. In the following description and claims, words such as “comprise” and “include” are open-ended terms and should be interpreted as “comprising but not limited to . . . ”.

The term “couple (or electrically connect)” used throughout the specification (including the appended claims) may refer to any direct or indirect connection. For example, if the disclosure states that a first device is coupled (or connected) to a second device, it should be interpreted to mean that the first device may be directly connected to the second device or that the first device may be indirectly connected to the second device through other devices or certain connection manners. Throughout the specification (including the appended claims) of the disclosure, terms such as “first” and "second" are used only to name discrete elements or to distinguish between different embodiments or ranges. Accordingly, the terms should not be construed as setting an upper limit or a lower limit on the number of elements and should not be used to limit the sequence in which the elements are arranged. In additional, whenever possible, Elements/components/steps using the same reference numerals in the drawings and the embodiments represent the same or similar parts. In different embodiments, the same reference numerals may be used or the same terms may be used to cross-refer to relevant descriptions of the elements/components/steps.

It should be noted that in the following embodiments, the technical features of several different embodiments may be replaced, recombined, and mixed to complete other embodiments without departing from the spirit of the disclosure. The features of the embodiments may be arbitrarily mixed and used together as long as the features do not violate the spirit of the disclosure or conflict with each other.

FIG. 1 is a schematic diagram of an auxiliary operation system according to an embodiment of the disclosure. Referring to FIG. 1, an auxiliary operation system 100 includes an image processing system 110, multiple sensing units 120_1 to 120_N, and a display 130, where N is a positive integer. The image processing system 110 is coupled to the sensing units 120_1 to 120_N and the display 130. In the embodiment, the image processor system 110 includes a response unit 111, a compensation unit 112, a control unit 113, and a display control unit 114. The display 130 has a human-computer interaction interface 131.

In an embodiment, the image processing system 110 may include a processor and a storage device. The processor may be a system on a chip (SOC) or may include, for example, a central processing unit (CPU), other programmable general-purpose or specific-purpose microprocessors, digital signal processors (DSPs), programmable controllers, image processors, application specific integrated circuits (ASICs), programmable logic devices (PLDs), other similar processing devices, or a combination of the devices. The storage device may be, for example, a dynamic random access memory (DRAM), a flash memory, a non-volatile random access memory (NVRAM), etc. In an embodiment, the storage device may store relevant algorithms or programs for implementing the response unit 111, the compensation unit 112, the control unit 113, and the display control unit 114, and to be executed by the processor. In an embodiment, the response unit 111, the compensation unit 112, the control unit 113, and the display control unit 114 may be implemented by an integrated chip or by individual independent computing circuits or chips together with relevant algorithms or programs.

In an embodiment, at least one of the sensing units 120_1 to 120_N may be disposed on a vehicle body. The vehicle body may include, for example, a vehicle casing inner side, vehicle windows, seats, a dashboard, a steering wheel, a vehicle interior, a space between a vehicle casing outer side and the vehicle interior, a rearview mirror, or any suitable position in a vehicle, which is not limited in the disclosure. The sensing units 120_1 to 120_N may be sensors that are optical, capacitive, resistive, or any combination thereof. The sensing units 120_1 to 120_N may include visible light cameras, infrared (IR) cameras, or other types of cameras and are configured to sense visible light, infrared, or light in other frequency bands. The sensing units 120_1 to 120_N may sense through stereo vision, structured light, or time of flight (ToF) sensing technology. In an embodiment, at least one of the sensing units 120_1 to 120_N may also be a touch sensing unit and is disposed in the display 130 (an embedded touch sensor) or on the display (a plug-in touch sensor). The touch sensing unit may be configured to sense touch information to generate a touch sensing signal.

In an embodiment, the display 130 may include a touch display panel to provide display and touch functions, but the disclosure is not limited thereto. The display 130 may include, for example, a liquid crystal display (LCD), a self-emissive display, a micro light-emitting diode (LED) display, an organic LED (OLED) display, a projection display, a head-up display, etc. In an embodiment, if the display 130 is the projection display or the head-up display, an image generated thereby may be projected on a projection screen, such as a projection board or a windshield. In an embodiment, the display 130 may only have a display panel to only provide a display function. In the embodiment, the display 130 may have the human-computer interaction interface 131 to provide a trigger feedback according to a trigger position of touch by a user. Moreover, the auxiliary operation system 100 may also enable and operate a corresponding vehicle device in the vehicle according to a touch operation result on the human-computer interaction interface 131.

Figure 2:
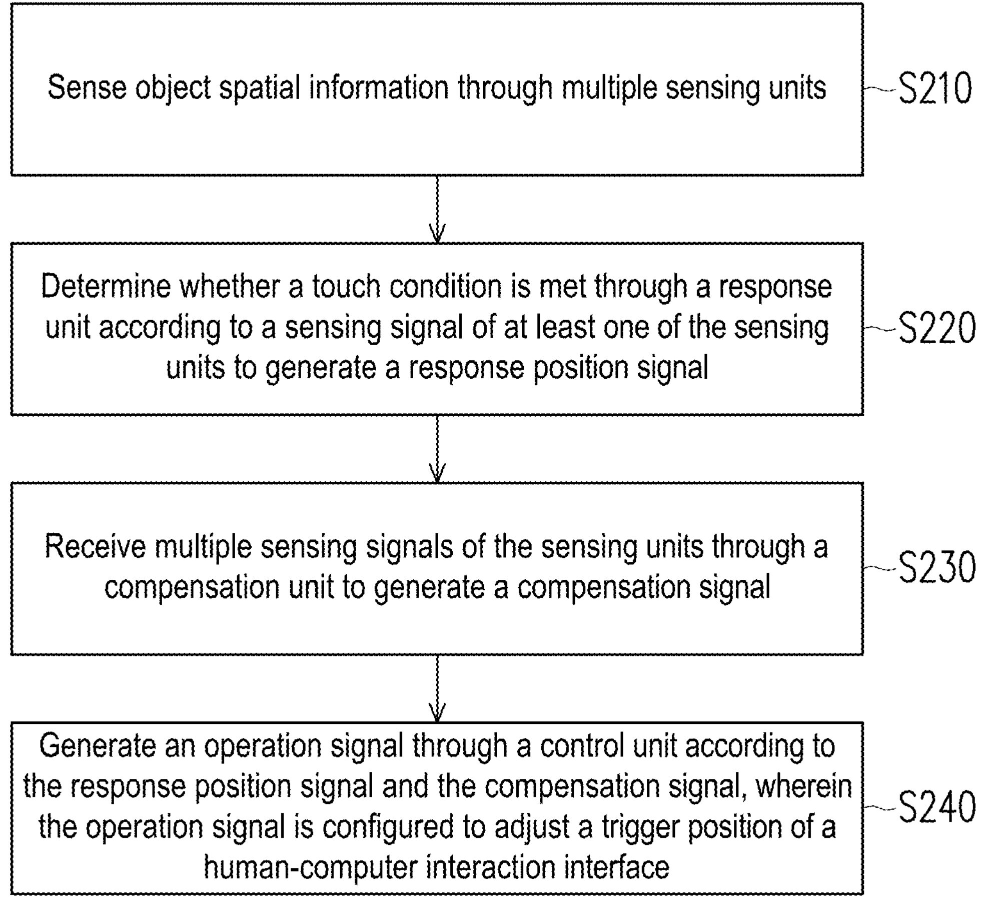
FIG. 2 is a flowchart of an auxiliary operation method according to an embodiment of the disclosure.

FIG. 2 is a flowchart of an auxiliary operation method according to an embodiment of the disclosure. Referring to FIG. 1 and FIG. 2, the auxiliary operation system 100 may execute the auxiliary operation method as shown by Steps S210 to S240 below. In Step S210, the auxiliary operation system 100 may sense object spatial information through the sensing units 120_1 to 120_N. In the embodiment, the sensing units 120_1 to 120_N may be configured to sense an image of the space inside the vehicle. Multiple sensing signals output by the sensing units 120_1 to 120_N may correspond to multiple sub-images. In an embodiment, the auxiliary operation system 100 may further include an image integration system and an in-vehicle positioning system. The image processing system 110, the image integration system, and the in-vehicle positioning system may be connected and communicate through an in-vehicle bus line. The image integration system and the in-vehicle positioning system may also be disposed in the image processing system 110. In an embodiment, the image integration system may integrate the sub-images to generate an integrated image. The image integration system may construct complete in-vehicle spatial information and the object spatial information through the integrated image. The object spatial information may include spatial information of body parts of the user in the vehicle, such as a user position, a user distance (for example, a distance between a finger and the human-computer interaction interface), a user line of sight, a user feature, and/or a user gesture. The in-vehicle positioning system may determine a spatial position of an in-vehicle equipment and positional information of the body parts of the user in the vehicle according to the complete in-vehicle spatial information. The image processing system 110 may determine a corresponding operation performed by the user in the vehicle in the image according to relevant information generated by the image integration system and the in-vehicle positioning system. The image processing system 110 may also transmit relevant control information of the touch operation result by the user on the human-computer interaction interface 131 of the display 130 to an in-vehicle control chip or an in-vehicle controller area network through the in-vehicle bus line, so that a relevant in-vehicle device (for example, the in-vehicle device such as an in-vehicle audio, an in-vehicle light, and an in-vehicle air conditioner) in the vehicle may execute a corresponding function.

In Step S220, the response unit 111 may determine whether a touch condition is met according to the sensing signal of at least one of the sensing units 120_1 to 120_N to generate a response position signal. In the embodiment, the user may perform a touch operation on the display 130 in the vehicle to, for example, control the in-vehicle device. The response unit 111 may, for example, recognize a touch position of a hand part of the user on the display 130 to generate the corresponding response position signal.

In Step S230, the compensation unit 112 may receive the sensing signals of the sensing units 120_1 to 120_N to generate a compensation signal. In the embodiment, the compensation unit 112 may generate the compensation signal according to a behavior, a posture, and/or a viewing angle of the user to correct the touch position of the hand part of the user on the display 130 or adjust a content displayed on the display 130.

In Step S240, the control unit 113 may generate an operation signal according to the response position signal and the compensation signal, wherein the operation signal is configured to adjust the trigger position of the human-computer interaction interface 131. In the embodiment, the control unit 113 may output the operation signal to the display control unit 114. The display control unit 114 may be, for example, a display control chip and may drive the display 130 to perform a display function. The display control unit 114 may also adjust the trigger position of the human-computer interaction interface 131 according to the operation signal and may control the human-computer interaction interface to execute the trigger feedback according to the trigger position. The trigger feedback may, for example, include at least one of a visual feedback, a tactile feedback, and an auditory feedback.

Therefore, the auxiliary operation system 100 and the auxiliary operation method of the embodiment can determine the touch operation performed by the user in the vehicle on the display 130 through image recognition and correspondingly assist the user to perform the relevant touch operation, so that the user can operate the vehicle device efficiently and conveniently. In addition, the generation manner of the sensing signal, the response position signal, and the compensation signal of the embodiment will be further described in the following embodiments.

Figure 3:
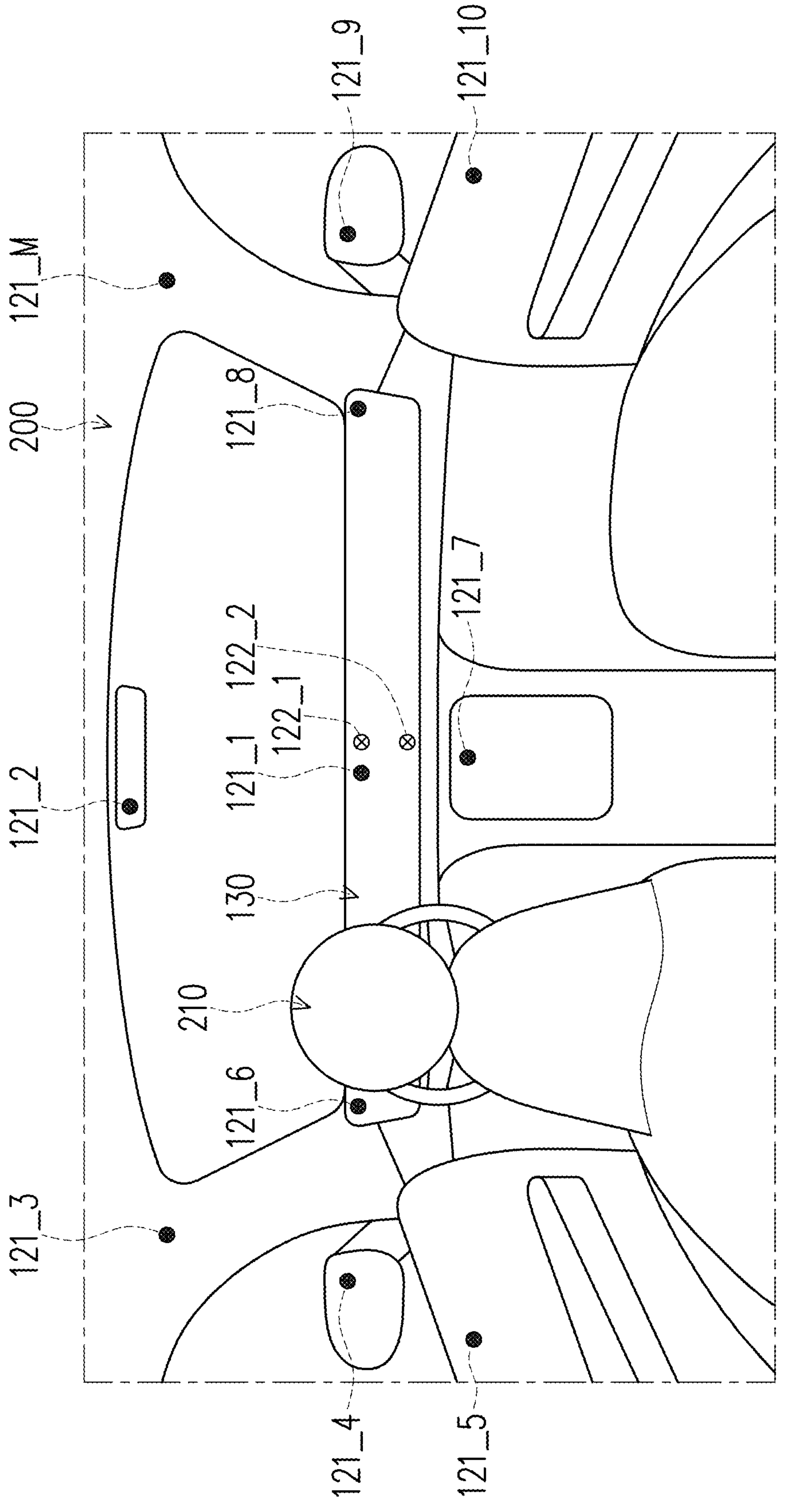
FIG. 3 is a schematic diagram of an in-vehicle configuration according to an embodiment of the disclosure.

FIG. 3 is a schematic diagram of an in-vehicle configuration according to an embodiment of the disclosure. Referring to FIG. 3, the sensing units 120_1 to 120_N of FIG. 1 may include first sensing units 121_1 to 121_M and second sensing units 122_1 and 122_2 of FIG. 3, where M is a positive integer. In the embodiment, the first sensing units 121_1 to 121_M are disposed on a vehicle body 200, and the second sensing units 122_1 and 122_2 are disposed in the display 130 or on the display 130 in the vehicle, where M is a positive integer. In the embodiment, respective capturing angle ranges covered by the first sensing units 121_1 to 121_M and the second sensing units 122_1 and 122_2 may be, for example, at least above 180 degrees.

In the embodiment, a distance between any two nearest and identical sensing units among the first sensing units 121_1 to 121_M and the second sensing units 122_1 and 122_2 is greater than a distance between any two nearest and different sensing units among the first sensing units 121_1 to 121_M and the second sensing units 122_1 and 122_2. Specifically, it is assumed that the first sensing unit 121_1 is nearest to the first sensing unit 121_7 belonging to the same sensing unit, the first sensing unit 121_1 is also nearest to the second sensing unit 122_1 belonging to a different sensing unit, and the distance between the first sensing unit 121_1 and the first sensing unit 121_7 is greater than the distance between the first sensing unit 121_1 and the second sensing unit 122_1.

In an embodiment, the first sensing units 121_1 to 121_M and the second sensing units 122_1 and 122_2 may be respectively configured to sense light of different wavebands. For example, the first sensing units 121_1 to 121_M may be configured to sense visible light, and the second sensing units 122_1 and 122_2 may be configured to sense infrared. In an embodiment, the first sensing units 121_1 to 121_M and the second sensing units 122_1 and 122_2 may also be configured to sense images with different resolutions. For example, the first sensing units 121_1 to 121_M may be configured to sense low-resolution images, and the second sensing units 122_1 and 122_2 may be configured to sense high-resolution images. In this regard, the resolution of the high-resolution image may be, for example, 1.5 times or more than the resolution of the low-resolution image. In other words, the computational load of the image processing system 110 can be effectively reduced, and the parsing accuracy of a specific region can be improved. In an embodiment, the first sensing units 121_1 to 121_M and the second sensing units 122_1 and 122_2 may also be configured to sense images of different ranges in the vehicle to focus on different features in the vehicle. For example, the first sensing units 121_1 to 121_M may be configured to sense images of large ranges in the vehicle, and the second sensing units 122_1 and 122_2 may be configured to sense images of small ranges in the vehicle.

In the embodiment, the image processing system 110 may capture in-vehicle image information, such as a distance between the user and the display 130, a relative speed, and/or a gesture, from various angles through the first sensing units 121_1 to 121_M and the second sensing units 122_1 and 122_2. Moreover, if the gesture of the user is determined to be a touch posture, the image processing system 110 may, for example, provide a touch signal at a position of a corresponding function icon in a display image displayed by the display 130, so as to achieve the touch function.

Figure 4:
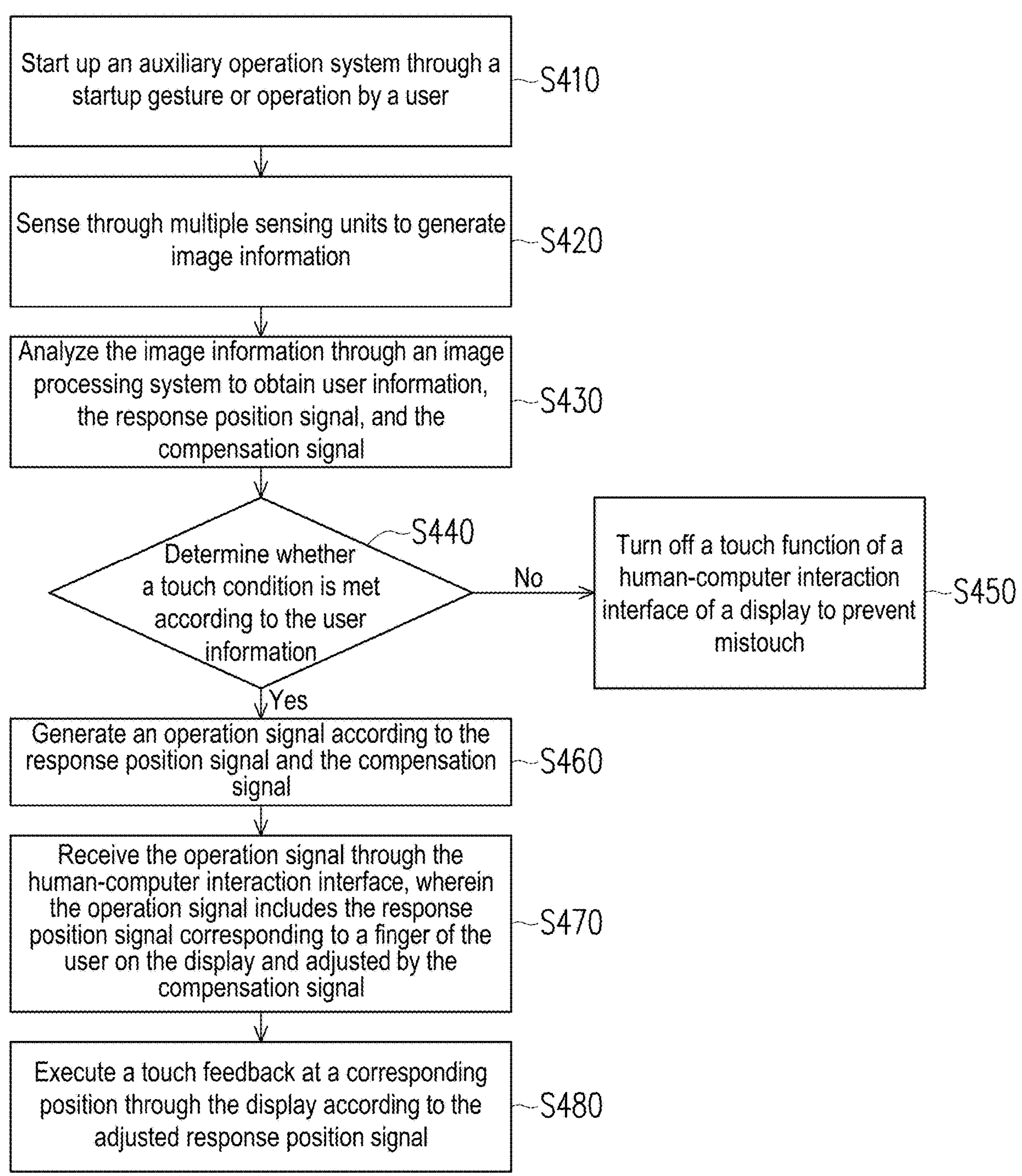
FIG. 4 is a flowchart of an auxiliary operation method according to an embodiment of the disclosure.

FIG. 4 is a flowchart of an auxiliary operation method according to an embodiment of the disclosure. Referring to FIG. 1, FIG. 3, and FIG. 4, the auxiliary operation system 100 may execute the auxiliary operation method as shown by Steps S410 to S480 below. In Step S410, a user 210 may start up the auxiliary operation system 100 through a startup gesture or operation. In Step S420, the auxiliary operation system 100 may sense through the first sensing units 121_1 to 121_M and the second sensing units 122_1 and 122_2 to generate image information. In an embodiment, the image processing system 110 receives the sensing signals corresponding to multiple sub-information and integrates the sub-information into the image information, but not limited thereto. In Step S430, the image processing system 110 analyzes the image information to obtain user information, the response position signal, and the compensation signal. In Step S440, the image processing system 110 may determine whether the touch condition is met according to the user information. If not, in Step S450, the display control unit 114 may turn off the touch function of the human-computer interaction interface 131 of the display 130 to prevent mistouch. If yes, in Step S460, the control unit 113 may generate the operation signal according to the response position signal and the compensation signal. In Step S470, the human-computer interaction interface 131 may receive the operation signal, wherein the operation signal includes the response position signal corresponding to the finger of the user 210 on the display 130 and adjusted by the compensation signal. In Step S480, the display 130 may execute the touch feedback at the corresponding position (that is, the trigger position) according to the adjusted response position signal.

Specifically, the image processing system 110 may construct the complete image information through the sensing information (that is, one or more sub-images) of at least one of the first sensing units 121_1 to 121_M and the second sensing units 122_1 and 122_2. The complete image information may, for example, include the user information (that is, the spatial information of the body parts of the user in the vehicle). In this regard, the image processing system 110 may, for example, execute a facial information unit, a gender information unit, and/or a biological information unit according to the user information to generate the relevant user features, and determine user identity and gender according to the user features. The image processing system 110 may also, for example, execute a facial recognition unit, a fingerprint recognition unit, and/or a voiceprint recognition unit, and recognize the identity of the user 210 according to the relevant user features. The image processing system 110 may also, for example, execute a head position estimation unit, an arm position estimation unit, an arm length estimation unit, and a skeleton estimation unit according to the user information to determine the user posture. The image processing system 110 may also, for example, execute an arm movement recognition unit and a finger movement recognition unit to determine whether the gesture of the user is the startup gesture or intended to perform the touch operation according to a determination result of the user posture. In this regard, the startup gesture may, for example, mean that a distance between the hand (or the finger) of the user 210 and a reference point is less than a preset distance, but the disclosure is not limited thereto. In an embodiment, the startup gesture may also be other specific gestures preset by the user.

Figure 5A:
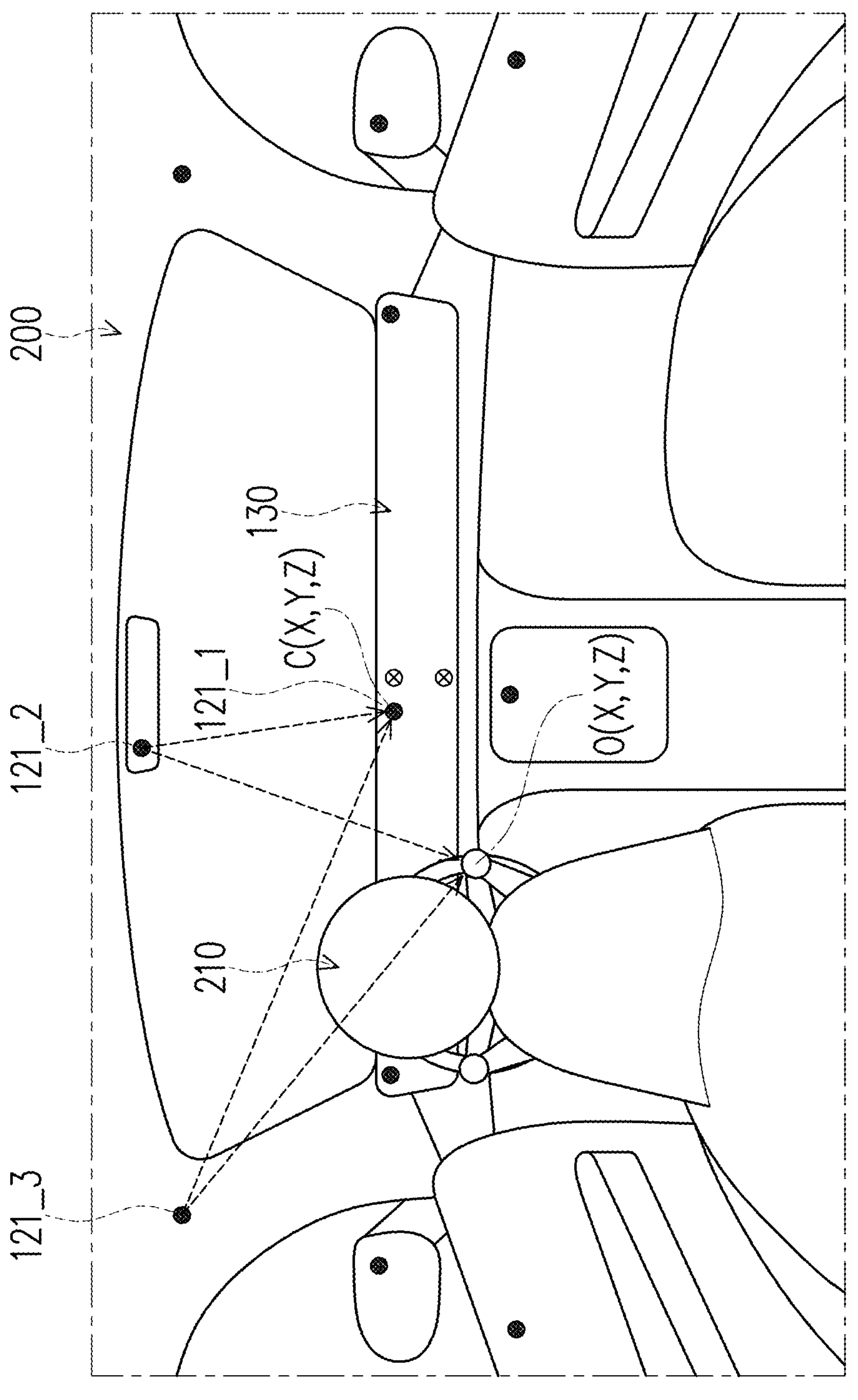
FIG. 5A and FIG. 5B are schematic diagrams of an in-vehicle scenario according to an embodiment of the disclosure.
Figure 5B:
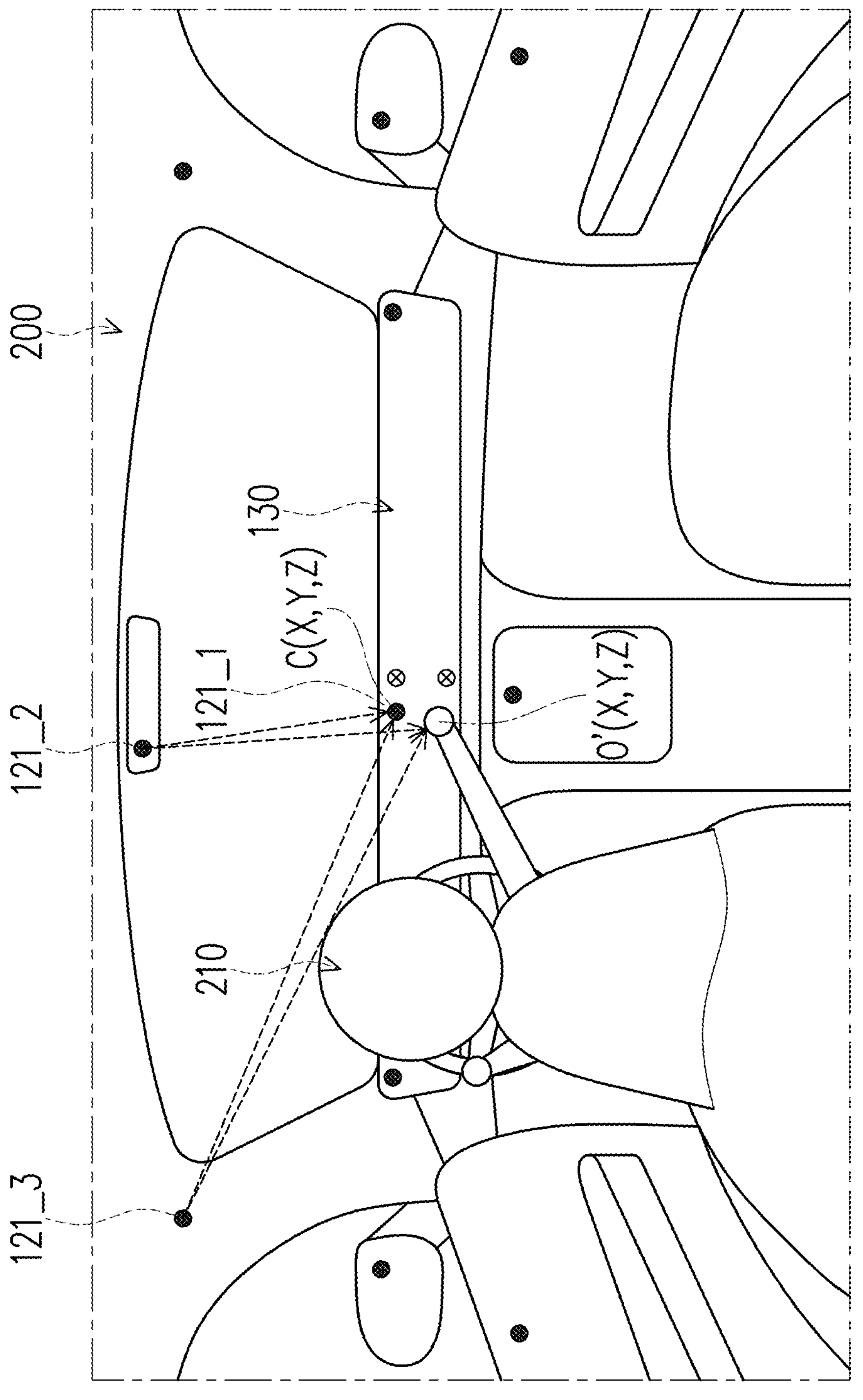

Also referring to FIG. 5A, both hands of the user 210 may be placed on the steering wheel. The first sensing unit 121_2 and the first sensing unit 121_3 may use the first sensing unit 121_1 as the reference point. The first sensing unit 121_1 has coordinates C (X,Y,Z) known to the system. The first sensing unit 121_2 and the first sensing unit 121_3 may position the right hand of the user 210, so that the control unit 113 may calculate to obtain coordinates O(X,Y,Z). Moreover, the control unit 113 may calculate a distance between the coordinates C(X,Y,Z) and the coordinates O(X, Y,Z) (that is, ΔCO(X,Y,Z)=C(X,Y,Z)−O(X,Y,Z)). Next, also referring to FIG. 5B, the right hand of the user 210 may move and approach the display 130. The first sensing unit 121_2 and the first sensing unit 121_3 may reposition the right hand of the user 210, so that the control unit 113 may calculate to obtain coordinates O'(X, Y,Z). Moreover, the control unit 113 may calculate a distance between the coordinates C(X, Y,Z) and the coordinates O'(X,Y,Z) (that is, ΔCO'(X,Y,Z)=C(X,Y,Z)−O'(X,Y,Z)). In this way, the control unit 113 may determine whether the right hand of the user 210 is close to the display 130 through comparing the distance ΔCO(X,Y,Z) and the distance ΔCO'(X,Y,Z). In this regard, when the control unit 113 determines that the right hand of the user 210 continues moving for a period of time and gradually approaches the display 130, the control unit 113 determines that the gesture of the right hand of the user 210 is the startup gesture. In this way, in response to the control unit 113 sensing the startup gesture or the touch operation of the user 210 according to at least one of the sensing units, the control unit 113 may generate a startup signal to start up the auxiliary operation system to perform touch condition determination. The control unit 113 may determine whether the user 210 intends to perform hovering touch or direct touch.

Figure 6A:
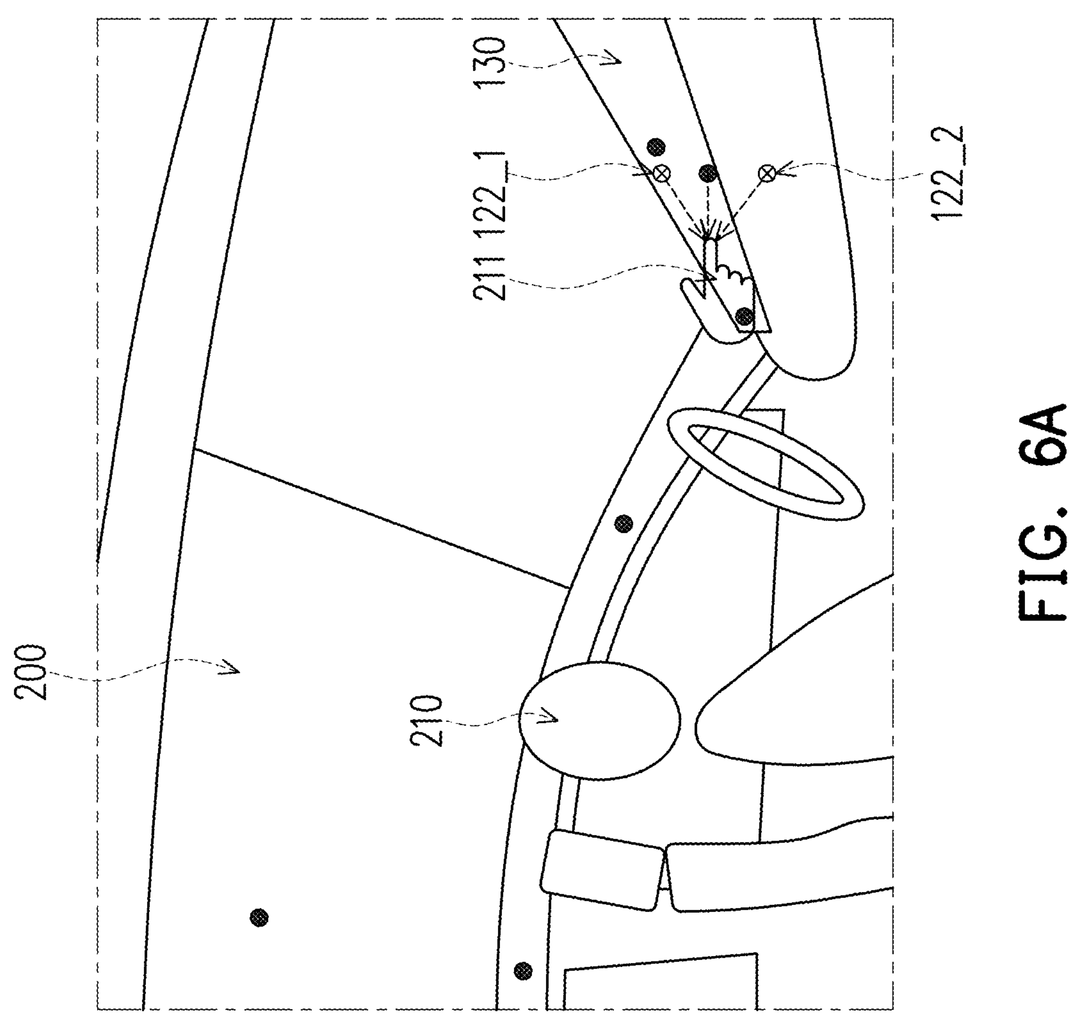
FIG. 6A and FIG. 6B are schematic diagrams of an in-vehicle scenario according to an embodiment of the disclosure.

Also referring to FIG. 6A, when the image processing system 110 determines that a hand part 211 of the user 210 continues moving for a period of time and gradually approaches the display 130 through the above embodiment, the control unit 113 may generate the startup signal to start up the auxiliary operation system. Moreover, when the control unit 113 determines that the hand part 211 of the user 210 is within 0 to 10 centimeters from the display 130 through the second sensing units 122_1 and 122_2, the control unit 113 may determine that the hand part 211 of the user 210 intends to perform the hovering touch. In this regard, the control unit 113 may define a position of a vertical projection of the finger of the hand 211 of the user 210 on the display 130 as a center point and define a first specific range outward from the center point (for example, a range of a radius of 5 centimeters outward from the center point) as a touch allowable range. When the icon on the human-computer interaction interface 131 of the display 130 is located within the allowable touch range, the control unit 113 may regard the icon as the icon that the user 210 intends to touch to execute the corresponding function. At this time, the human-computer interaction interface 131 may implement the trigger feedback through vibrating the steering wheel, seat vibration, seat belt vibration, spraying gas from the display 130, or other manners that may provide the trigger feedback to the user, but the disclosure is not limited thereto. Moreover, when the control unit 113 determines that the hand part 211 of the user 210 is away from the display 130 through the second sensing units 122_1 and 122_2, and the distance exceeds a first preset distance (for example, 10 centimeters), the control unit 113 may determine that the user 210 intends to end the touch, and the control unit 113 ends the touch condition determination. Alternatively, when the control unit 113 determines that the position of the vertical projection of the finger of the hand part 211 of the user 210 on the display 130 is away from the display 130 by a second preset distance (for example, 5 centimeters) on a display surface, the control unit 113 may determine that the user 210 intends to end the touch, and the control unit 113 ends the touch condition determination.

In addition, in an embodiment, the control unit 113 may also determine the distance between the hand part 211 of the user 210 and the display 130 through at least one of the first sensing units 121_1 to 121_M.

However, when the image processing system 110 determines that the hand part 211 of the user 210 continues moving for a period of time and gradually approaches the display 130 through the above embodiment, the control unit 113 may generate the startup signal to start up the auxiliary operation system. Moreover, when the control unit 113 determines that the hand part 211 of the user 210 directly touches the display 130 through the second sensing units 122_1 and 122_2, the control unit 113 may determine that the hand part 211 of the user 210 intends to perform the direct touch. In this regard, the control unit 113 may define the position of the vertical projection of the finger of the hand part 211 of the user 210 on the display 130 as the center point and define a second specific range outward from the center point (for example, a range of a radius of 2 centimeters outward from the center point) as the touch allowable range. When the icon on the human-computer interaction interface 131 of the display 130 is located within the allowable touch range, the control unit 113 may regard the icon as the icon that the user 210 intends to touch to execute the corresponding function. At this time, the human-computer interaction interface 131 may implement the trigger feedback by feedbacking a rough touch (such as creating a rough sensation using an ultrasonic vibration panel) through the display 130 or spraying gas from the display 130, but the disclosure is not limited thereto. Moreover, when the control unit 113 determines that the hand part 211 of the user 210 is away from the display 130 through the second sensing units 122_1 and 122_2, and the distance exceeds a third preset distance (for example, 4 centimeters), the control unit 113 may determine that the user 210 intends to end the touch, and the control unit 113 ends the touch condition determination. Alternatively, when the control unit 113 determines that the position of the vertical projection of the finger of the hand part 211 of the user 210 on the display 130 is away from the display 130 by a fourth preset distance (for example, 2 centimeters) on the display surface, the control unit 113 may determine that the user 210 intends to end the touch, and the control unit 113 ends the touch condition determination.

Figure 6B:
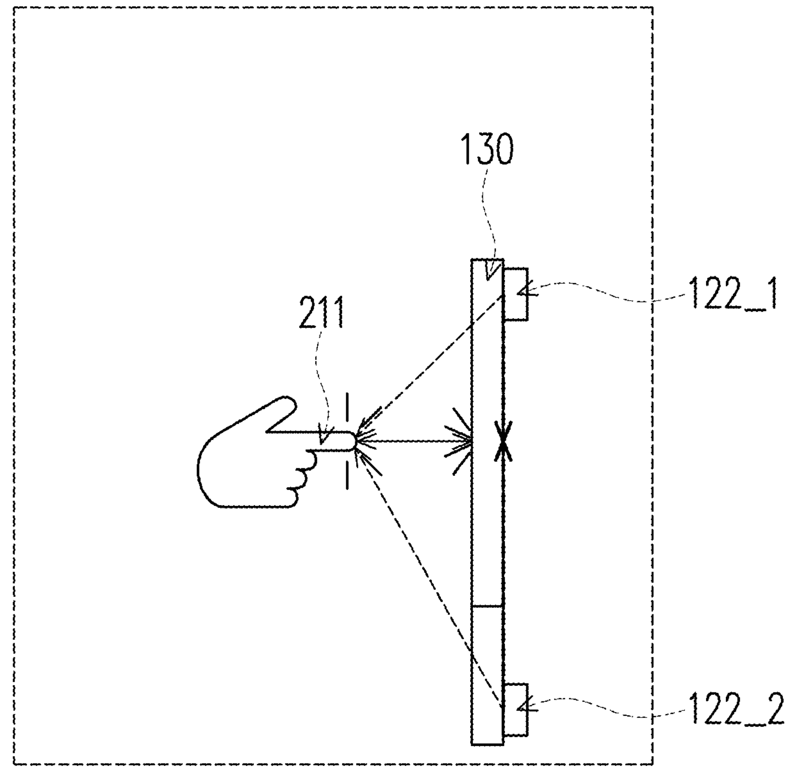

Also referring to FIG. 6B, the second sensing units 122_1 and 122_2 may also be disposed behind the display panel of the display 130 and sense the hand part 211 of the user 210 through detecting infrared, so that the control unit 113 may calculate the distance between the hand part 211 of the user 210 and the display 130.

In the embodiment, the compensation unit 112 may generate the compensation signal according to the sensing signals of the sensing results of sensing the object spatial information. The compensation unit 112 may interpret the user identity and the user posture through the user information in the image information and may further adjust relevant settings. The image processing system 110 may perform identity recognition (for example, facial recognition, fingerprint recognition, and/or voiceprint recognition), physical feature recognition (for example, arm length), and/or driving habit confirmation (for example, the distance between the driver seat and the steering wheel) of the user through the sensing signal of at least one of the first sensing units 121_1 to 121_M and the second sensing units 122_1 and 122_2. In this regard, the compensation unit 112 may adjust the trigger position of the human-computer interaction interface 131 of the display 130 according to physical features and driving habits, but the disclosure is not limited thereto. In addition, the control unit 113 may also set a corresponding permission according to the user identity. For example, the vehicle owner has a higher control permission, and non-vehicle owners have lower control permissions, but the disclosure is not limited thereto.

Figure 7A:
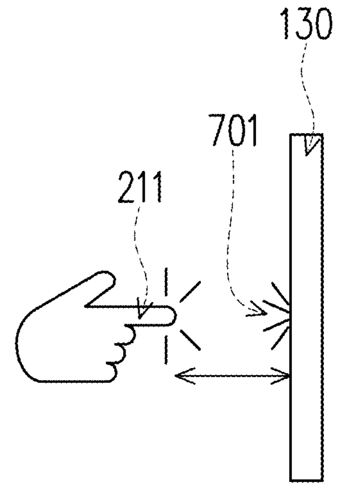
FIG. 7A and FIG. 7B are schematic diagrams of an in-vehicle scenario according to an embodiment of the disclosure.
Figure 7B:
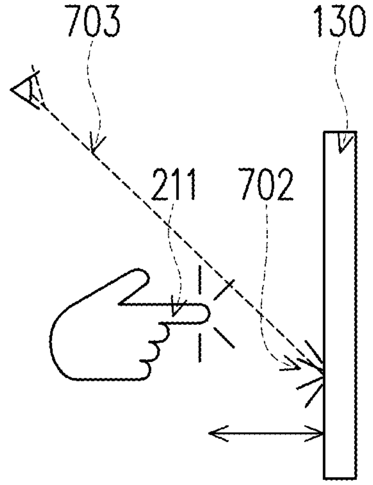

Also referring to FIG. 7A, the image processing system 110 may first determine the position (that is, an original touch position 701) of the vertical projection of the finger of the hand part 211 of the user 210 on the display 130 through the sensing signal of at least one of the first sensing units 121_1 to 121_M and the second sensing units 122_1 and 122_2, and the response unit 111 may generate the corresponding response position signal (for example, touch position coordinates). Referring next to FIG. 7B, at least one of the first sensing units 121_1 to 121_M and the second sensing units 122_1 and 122_2 may, for example, sense an eye position and/or a line of sight direction of the user. The compensation unit 112 may determine directional information of a user line of sight 703 according to the eye position and/or the line of sight direction of the user. The directional information may, for example, include spatial information of the line of sight direction and positional information extending onto the display 130. The compensation unit 112 may further generate the corresponding compensation signal according to the directional information of the original touch position 701 and the user line of sight 703, so that the control unit 113 may adjust the response position signal (such as adjusting the touch position coordinates) according to the corresponding compensation signal, so that the original touch position 701 may be adjusted to a touch position 702 (that is, the trigger position). In this way, the human-computer interaction interface 131 of the display 130 may perform subsequent touch determination according to the correct touch position 702.

Figure 8A:
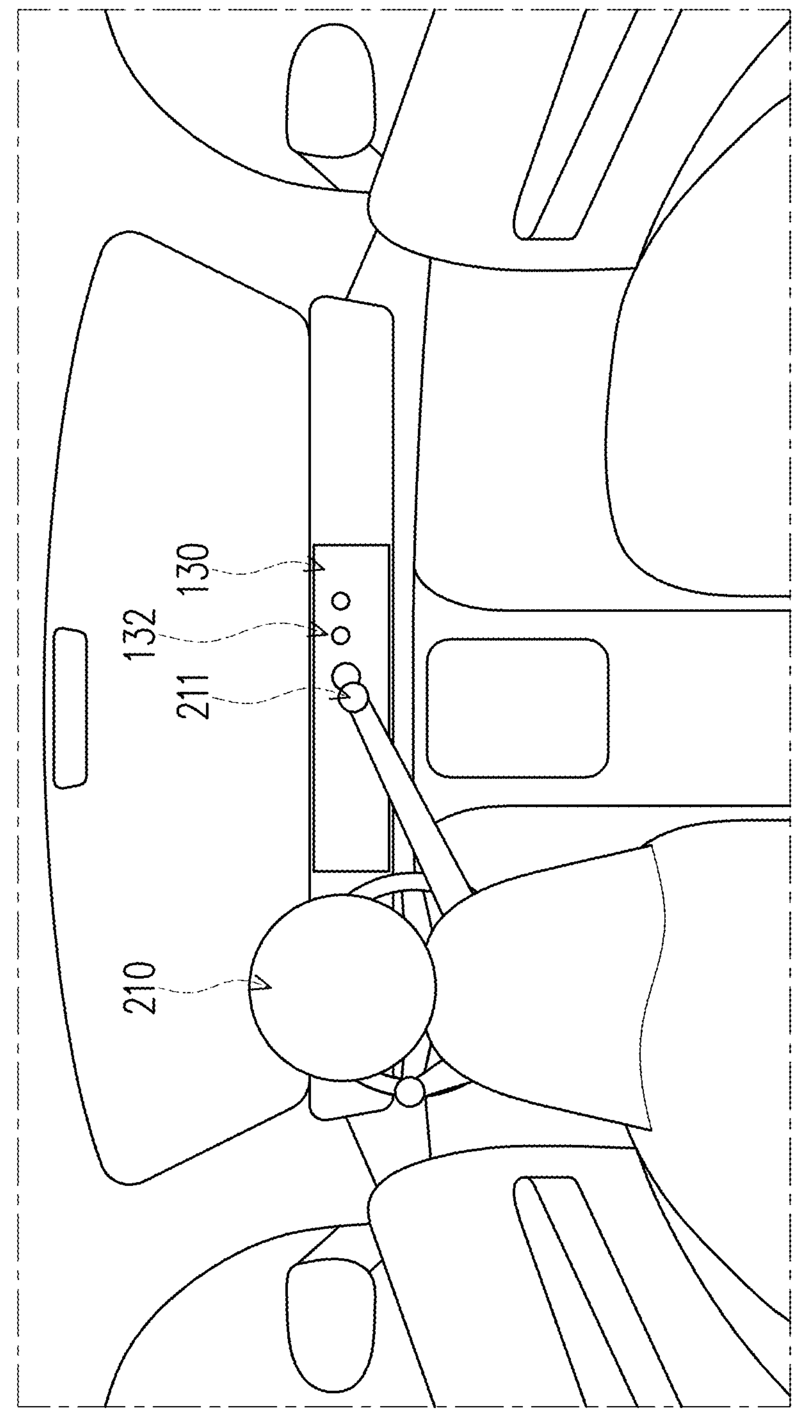
FIG. 8A to FIG. 8C are schematic diagrams of an in-vehicle scenario according to an embodiment of the disclosure.

Also referring to FIG. 8A, the compensation unit 112 may, for example, determine that the arms of the user 210 are longer according to the user features and/or the user posture in the object spatial information, so the human-computer interaction interface 131 of the display 130 may maintain the position of an icon 211. In addition, the human-computer interaction interface 131 may also automatically adjust the icon 211 to make the icon 211 more conspicuous, such as enlarging the icon 211 such that the icon 211 may be more easily selected by the user 210 or brightening the edge of the icon 211 such that the icon 211 may be more easily identified by the user, but the disclosure is not limited thereto.

Figure 8B:
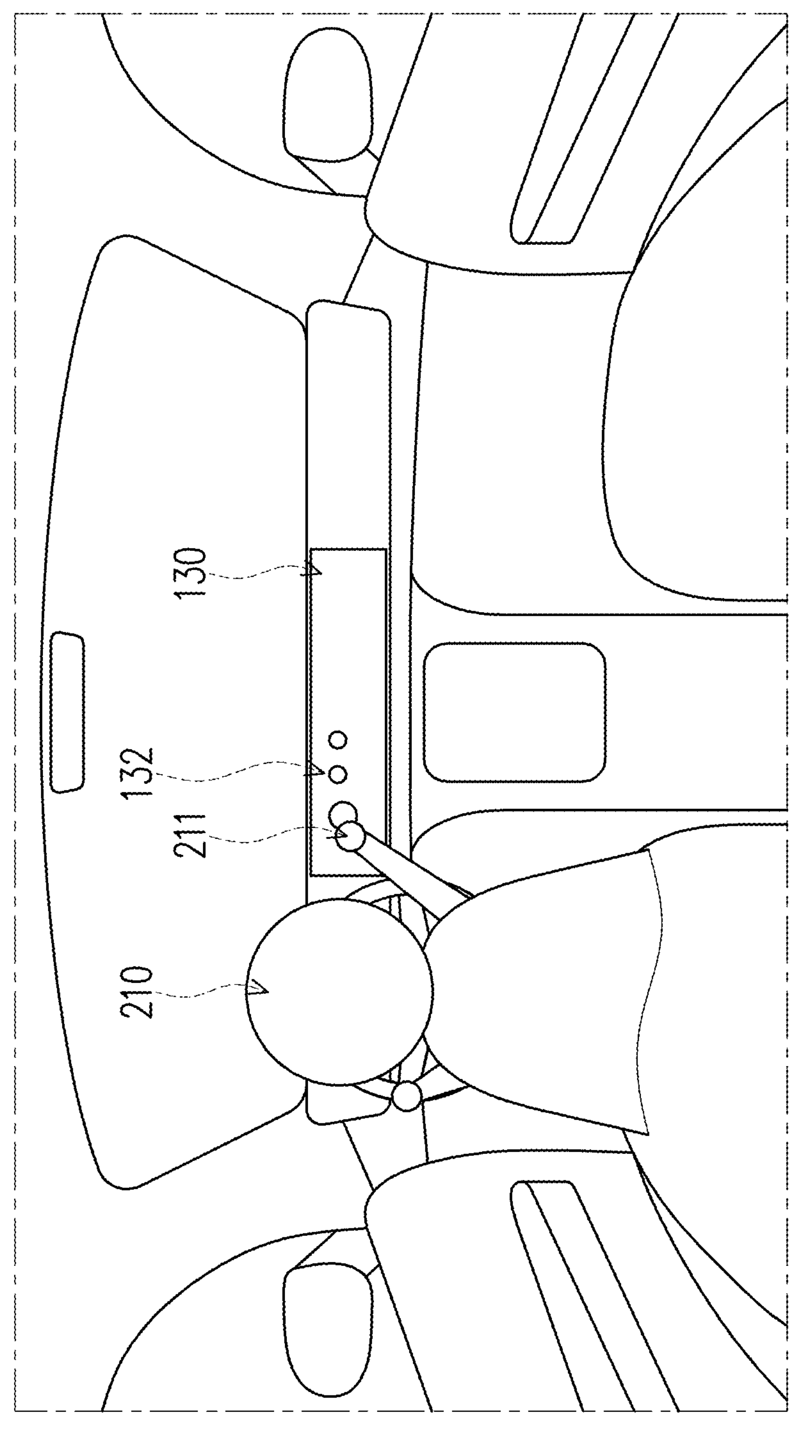

Also referring to FIG. 8B, the compensation unit 112 may, for example, determine that the arms of the user 210 are shorter according to the user features and/or the user posture in the object spatial information, so the compensation unit 112 may generate the corresponding compensation signal, so that the control unit 113 may generate the operation signal according to the response position signal and the compensation signal, and the operation signal may adjust the trigger position in the human-computer interaction interface 131 (that is, the position of the icon 211 in the human-computer interaction interface 131). In this way, the human-computer interaction interface 131 of the display 130 may automatically adjust the position of the icon 211 to make the icon 211 closer to the user 210 to facilitate touching by the user 210.

Figure 8C:
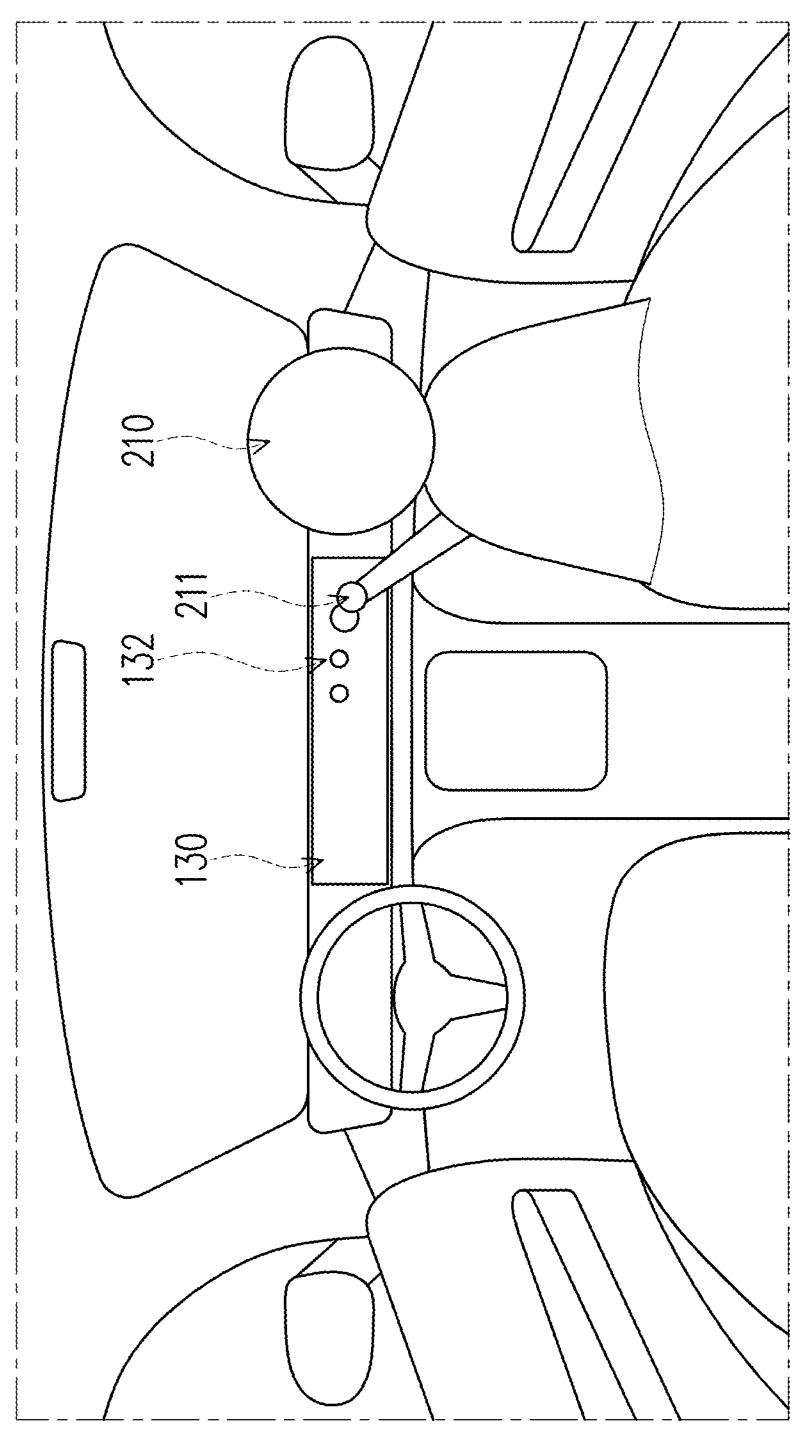

Also referring to FIG. 8C, the compensation unit 112 may, for example, determine that the user 210 is sitting on a passenger seat position on the other side according to the user features and/or the user posture in the object spatial information. Therefore, the compensation unit 112 may generate the corresponding compensation signal, so that the control unit 113 may generate the operation signal according to the response position signal and the compensation signal, and the operation signal may adjust the trigger position in the human-computer interaction interface 131 (that is, the position of the icon 211 in the human-computer interaction interface 131). In this way, the human-computer interaction interface 131 of the display 130 may automatically adjust the position of the icon 211 to make the icon 211 closer to the passenger seat to facilitate touching by the user 210.

In addition, the compensation unit 112 may also, for example, generate the compensation signal according to a seat position of the driver seat. Assuming that the driver seat is closer to the steering wheel, it means that the user 210 may easily touch the human-computer interaction interface 131 of the display 130, so the human-computer interaction interface 131 of the display 130 may maintain the position of the icon 211. Alternatively, assuming that the driver seat is further away from the steering wheel, it means that it is more difficult for the user 210 to touch the human-computer interaction interface 131 of the display 130, so the human-computer interaction interface 131 of the display 130 may automatically adjust the position of the icon 211 to make the icon 211 closer to the user 210 to facilitate touching by the user 210.

In summary, the auxiliary operation system and the auxiliary operation method of the disclosure can sense the in-vehicle environment and the user information through the sensing units to determine the touch operation behavior by the user and generate the corresponding response position signal and compensation signal, so that the user can perform the touch operation on the human-computer interaction interface effectively and conveniently. The auxiliary operation system and the auxiliary operation method of the disclosure can also adjust the trigger position according to the user line of sight, so that the human-computer interaction interface can correctly determine the touch result of the user.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An auxiliary operation system of a vehicle device, comprising:

a display, having a human-computer interaction interface;

a plurality of sensing units, disposed at different positions in a vehicle and configured to sense object spatial information; and an image processing system, wherein the image processing system is configured to determine a user identity of a user according to at least one user feature of the user, and the image processing system includes:

a response unit, coupled to the sensing units and configured to determine whether a touch condition is met according to a sensing signal of at least one of the sensing units to generate a response position signal;

a compensation unit, coupled to the sensing units and configured to receive a plurality of sensing signals of the sensing units to generate a compensation signal; and a control unit, coupled to the response unit and the compensation unit, and configured to generate an operation signal according to the response position signal and the compensation signal, wherein the operation signal is configured to adjust a trigger position of the human-computer interaction interface, wherein the control unit is further configured to set different control permissions according to user identities corresponding to different users in the vehicle, wherein the control unit is further configured to determine a distance between a hand part of the user and the display based on the sensing signals, wherein in response to that the distance between the hand part of the user and the display is within a preset hovering range, the control unit is configured to determine that the hand part intends to perform a hovering touch.

2. The auxiliary operation system according to claim 1, wherein at least one of the sensing units is disposed on a vehicle body, and the response unit determines whether the touch condition is met according to the sensing signal of at least one of the sensing units.

3. The auxiliary operation system according to claim 1, wherein at least one of the sensing units is a touch sensing unit, and at least one of the sensing units is disposed in the display or on the display, wherein the touch sensing unit is configured to sense touch information to generate a touch sensing signal, and the response unit determines whether the touch condition is met according to the touch sensing signal.

4. The auxiliary operation system according to claim 1, wherein the sensing units comprise a plurality of first sensing units and a plurality of second sensing units, and the first sensing units and the second sensing units are respectively configured to sense light of different wavebands.

5. The auxiliary operation system according to claim 4, wherein a distance between any two nearest and identical sensing units among the first sensing units and the second sensing units is greater than a distance between any two nearest and different sensing units among the sensing units.

6. The auxiliary operation system according to claim 1, wherein at least one of the sensing units is configured to sense a user line of sight of a user, and the compensation unit is configured to generate the compensation signal according to directional information of the user line of sight, so that the control unit adjusts the response position signal according to the compensation signal.

7. The auxiliary operation system according to claim 1, wherein first sensing units of the plurality of sensing units are configured to sense images of large ranges in the vehicle, and second sensing units of the plurality of sensing units are configured to sense images of small ranges in the vehicle.

8. The auxiliary operation system according to claim 1, wherein the human-computer interaction interface executes a trigger feedback according to the trigger position, wherein the trigger feedback comprises at least one of a visual feedback, a tactile feedback, and an auditory feedback.

9. The auxiliary operation system according to claim 1, wherein in response to the control unit sensing a startup gesture or a touch operation of the user according to at least one of the sensing units, the control unit generates a startup signal to start up the auxiliary operation system.

10. The auxiliary operation system according to claim 1, wherein the sensing signals correspond to a plurality of sub-images, and the auxiliary operation system integrates the sub-images to generate an integrated image, wherein the integrated image is configured to construct the object spatial information.

11. An auxiliary operation method of a vehicle device, comprising:

sensing object spatial information through a plurality of sensing units;

determining a user identity of a user through an image processing system according to at least one user feature of the user;

determining whether a touch condition is met through a response unit according to a sensing signal of at least one of the sensing units to generate a response position signal;

receiving a plurality of sensing signals of the sensing units through a compensation unit to generate a compensation signal; generating an operation signal through a control unit according to the response position signal and the compensation signal, wherein the operation signal is configured to adjust a trigger position of a human-computer interaction interface; and setting different control permissions according to user identities corresponding to different users in a vehicle, wherein the control unit is further configured to determine a distance between a hand part of the user and a display based on the sensing signals, wherein in response to that the distance between the hand part of the user and the display is within a preset hovering range, the control unit is configured to determine that the hand part intends to perform a hovering touch.

12. The auxiliary operation method according to claim 11, wherein the step of determining whether the touch condition is met comprises:

determining whether the touch condition is met according to the sensing signal of at least one of the sensing units disposed on a vehicle body.

13. The auxiliary operation method according to claim 11, wherein at least one of the sensing units is a touch sensing unit, and at least one of the sensing units is disposed in a display or on the display, wherein the step of determining whether the touch condition is met comprises:

sensing touch information through the touch sensing unit to generate a touch sensing signal; and determining whether the touch condition is met through the response unit according to the touch sensing signal.

14. The auxiliary operation method according to claim 11, wherein the sensing units comprise a plurality of first sensing units and a plurality of second sensing units, and the first sensing units and the second sensing units are respectively configured to sense light of different wavebands.

15. The auxiliary operation method according to claim 14, wherein a distance between any two nearest and identical sensing units among the first sensing units and the second sensing units is greater than a distance between any two nearest and different sensing units among the sensing units.

16. The auxiliary operation method according to claim 11, wherein at least one of the sensing units is configured to sense a user line of sight of a user, and the compensation unit is configured to generate the compensation signal according to directional information of the user line of sight, so that the control unit adjusts the response position signal according to the compensation signal.

17. The auxiliary operation method according to claim 11, wherein first sensing units of the plurality of sensing units are configured to sense images of large ranges in a vehicle, and second sensing units of the plurality of sensing units are configured to sense images of small ranges in the vehicle.

18. The auxiliary operation method according to claim 11, further comprising:

executing a trigger feedback through the human-computer interaction interface according to the trigger position, wherein the trigger feedback comprises at least one of a visual feedback, a tactile feedback, and an auditory feedback.

19. The auxiliary operation method according to claim 11, further comprising:

in response to the control unit sensing a startup gesture or a touch operation of a user according to at least one of the sensing units, generating a startup signal through the control unit to start up the auxiliary operation system.

20. The auxiliary operation method according to claim 11, wherein the sensing signals correspond to a plurality of sub-images, and the auxiliary operation system integrates the sub-images to generate an integrated image, wherein the integrated image is configured to construct the object spatial information.

* * * * *